Nov. 28, 1950  J. R. FISH  2,531,809
CENTER
Filed Jan. 31, 1946
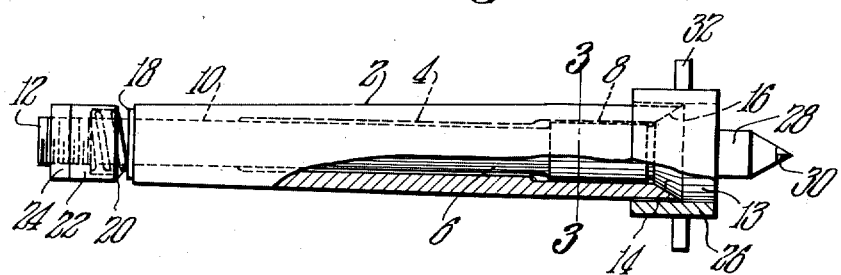
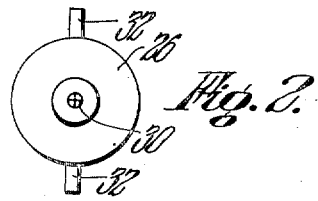
INVENTOR.
John Robert Fish.
BY Walter C. Ross
Attorney.

Patented Nov. 28, 1950

2,531,809

UNITED STATES PATENT OFFICE 2,531,809

CENTER

John Robert Fish, Springfield, Mass.

Application January 31, 1946, Serial No. 644,548

1 Claim. (Cl. 82—33)

This invention relates to improvements in center construction and is directed more particularly to centers for supporting and rotating an object such as a piece of work which is supported thereby.

The principal objects of the invention are directed to a center construction which is characterized by means for rotating a piece of work which is supported thereby. This is accomplished in a broad way by the provision of a stationary center member and a work supporting center member rotatable relative thereto, the former being adapted for associating with a stationary member of a machine tool and the latter adapted to be driven by a rotating part of said machine whereby work supported thereby is rotated or driven as is desirable and necessary in connection with machining operations.

It is customary in various machining operations in a lathe or other machine tool to rotatably support a piece of work by and between a tail stock center at its one end and at its opposite end by a center in a rotating spindle of the head stock with a dog or some other connecting means connecting the rotating spindle and work so that it is rotated from the said spindle.

Such an arrangement offers many objections one of which is that the dog or connecting means interferes with the freedom of action of the tool on the work. It is necessary since the dog engages the work to remove the work and dog after some machining has been performed and engage the dog with a different portion of the work and place it between centers in order to complete the machining.

According to this invention, a stationary part of the center is insertable in a stationary part of a machine tool while a relatively rotatable part thereof may be rotated by a rotating element of the machine. The said rotating part is adapted to support a piece of work or an end thereof and to rotate the work while the other end of the work may be supported in the center of a tail stock.

In this way not only is the piece of work adequately supported but it is rotated or driven by the supporting means thereby eliminating the usual driving dog or the like so that the piece of work is readily accessible for the tool or tools to the end that the complete machining operation may be performed and precision in results is assured.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Fig. 1 is a side elevational view of a center construction embodying the novel features of the invention;

Fig. 2 is an end elevational view of the center construction shown in Fig. 1;

Fig. 3 is a sectional elevational view on the line 3—3 of Fig. 1.

Referring now to the drawings more in detail, the invention will be fully described.

An outer non-rotating body or stationary center 2 is provided which has a longitudinal central bore 4. The outer surface of the body is preferably tapered as shown and at such an angle as agrees with the tapering bore of a stationary spindle or the like of the head stock of a lathe or the like.

An inner rotatable or drive center member 6 extends through the bore 4 of the body. A portion of member 6 clears the bore 4 while a portion 10 thereof may have a running fit in said bore.

The rear end 12 of the member 6 extends beyond the rear end of the body and is provided with screw threads 12, as shown.

A forward or outer head end 13 of the member 6 is provided with a conical male head portion 14 which is rotatable in a conical female seat 16 at the outer end of the bore 4 of said rotatable member 2.

A thrust washer 18 is provided at the rear or inner end of the body 2 and a compression spring 20 surrounds the rear end of member 6, as shown.

Nuts 22 and 24 are in threaded engagement with the threaded end 12 of the member 6 and may be adjusted to vary the action of the spring 20 thereby to urge the male and female parts into rotatable relation under more or less pressure.

An outer nose part 26 is secured to the head 13 and in the form of the invention shown, carries a projection or supporting center 28 in the form of a driving center which has one or more somewhat sharp edges 30. The part 28 may be separable from the part 13 as may be desired.

One or more radial arms or drive members such as 32 are provided on the nose part 26 which are adapted to be engaged by a rotating part of a machine to facilitate driving or rotating of the drive center relative to the stationary center.

The nose part 26 may be formed as a separate component which is secured to the head part 13 but it may be made integral with the part 13 if desired.

The arms 32 may take any form desired and the work driving center 28 may be varied within wide limits. In the form of the invention shown, the part 28 is adapted to enter the center hole in a piece of work and impinge sufficiently to rotate the work supported thereby. In some cases the piece of work will not have a center hole and the part 28 may be formed so as to support and drive the work.

In practice the body or stationary part 2 is inserted in the hole of a stationary part of a machine tool which may be a stationary spindle. A piece of work has its end remote from the said stationary part rotatably supported by a center disposed in a center hole thereof. A center hole in the other or driven end of the work receives the center part 28 in such a manner that the work is supported thereby but non-rotatable relative thereto.

In this way the work is rotatably supported in such a manner that it is driven or rotated as the member 26 is rotated.

The said member 26 and center part 6 may be rotated by any rotating part of the machine by operably connecting the same to the arms 32 or rotating means may be operably connected to the end of member 6 and said means may take any form desired such as a flexible shaft or the like.

The nuts 22 and 24 may be adjusted to vary the action of the spring 20 which maintains the part 14 in the seat 16 and controls the resistance of the parts to becoming unseated.

In some cases the character of the work may be such that the driving center is formed to function as the sole support for the work which it rotates or drives thereby eliminating the center used in the tail stock.

The center component which is rotated so as to rotate the work by reason of the novel means of journalling rotates on a true axis so as to insure accuracy in the machining operations on the work supported and driven thereby.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A center construction comprising in combination, an outer non-rotating tapered stationary member having a longitudinal central bore with the sides of the bore at the forward end diverging outwardly and providing a conical female socket at the extremity thereof, an inner rotatable drive center member extending through the central bore of said stationary member and having a forward end provided with a conical male head portion complemental to and rotatable in the conical female socket at the outer end of the bore of said stationary member, a compression spring provided at the rear end of said center member and backed therewith by nuts for adjusting the spring action and for urging said stationary and center members into rotatable relation under more or less pressure, an outer nose part secured to the head and carrying a projection having a sharp edge, a radial arm member provided on said nose part and adapted to be engaged by a rotating element of a machine to facilitate driving relative to said stationary member.

JOHN ROBERT FISH.

REFERENCES CITED

The following references are of record in the file of this patent:

UNITED STATES PATENTS

| Number | Name | Date |
| --- | --- | --- |
| 53,683 | Rothwell | Apr. 3, 1866 |
| 1,198,030 | Helgerud | Sept. 12, 1916 |
| 1,440,189 | Turner | Dec. 26, 1922 |
| 1,721,988 | Davis | July 23, 1929 |
| 1,782,272 | Power | Nov. 18, 1930 |
| 2,124,164 | Fritzsch | July 19, 1938 |

FOREIGN PATENTS

| Number | Country | Date |
| --- | --- | --- |
| 522,130 | Germany | Apr. 1, 1931 |
| 353,720 | Italy | Oct. 26, 1937 |